United States Patent [19]
Ito et al.

[11] Patent Number: 5,760,702
[45] Date of Patent: Jun. 2, 1998

[54] RECEIVER WITH SYMBOL RATE SYNC

[75] Inventors: Shogo Ito, Yokohama; Yasushi Yamao, Yokosuka; Shinzo Ohkubo, Tokorozawa, all of Japan

[73] Assignee: Nit Mobile Communications Network Inc., Tokyo, Japan

[21] Appl. No.: 595,076

[22] Filed: Feb. 1, 1996

[30]  Foreign Application Priority Data

Jun. 10, 1994  [JP]  Japan ................. P06-129242

[51] Int. Cl.⁶ ............... G08B 5/22; G21C 23/00; H04Q 7/00
[52] U.S. Cl. ............. 340/825.44; 375/345; 455/31.1
[58] Field of Search ............... 340/825.44; 375/346, 375/344, 343, 350, 375, 371, 316, 317; 455/31.1, 242.1, 241.1, 307, 304, 306, 266

[56]  References Cited

U.S. PATENT DOCUMENTS

| | | | |
|---|---|---|---|
| 3,800,228 | 3/1974 | Acker | 325/323 |
| 5,404,379 | 4/1995 | Shyue et al. | 375/354 |
| 5,504,785 | 4/1996 | Becker et al. | 375/344 |
| 5,625,652 | 4/1997 | Petranovich | 375/355 |

FOREIGN PATENT DOCUMENTS

| | | |
|---|---|---|
| 60-254942 | 12/1985 | Japan . |
| 62-169534 | 7/1987 | Japan . |
| 3-60251 | 3/1991 | Japan . |
| 6-244791 | 9/1994 | Japan . |
| 7-67165 | 3/1995 | Japan . |

*Primary Examiner*—Michael Horabik
*Assistant Examiner*—Anthony A. Asongwed
*Attorney, Agent, or Firm*—Cushman Darby & Cushman IP Group of Pillsbury Madison & Sutro LLP

[57]  ABSTRACT

A receiver which receives a signal transmitted while the symbol rate is changed over from among a plurality of different values, and which varies, in accordance with the symbol rate, the pass band width of the filter that removes unwanted signals from the detector output. By compensating for changes in delay produced by alteration of the pass band width of the filter, a receiver, according to this invention, recovers a clock that is synchronized with the symbol rate after changeover, without discontinuities occurring when the symbol rate is changed over.

6 Claims, 2 Drawing Sheets

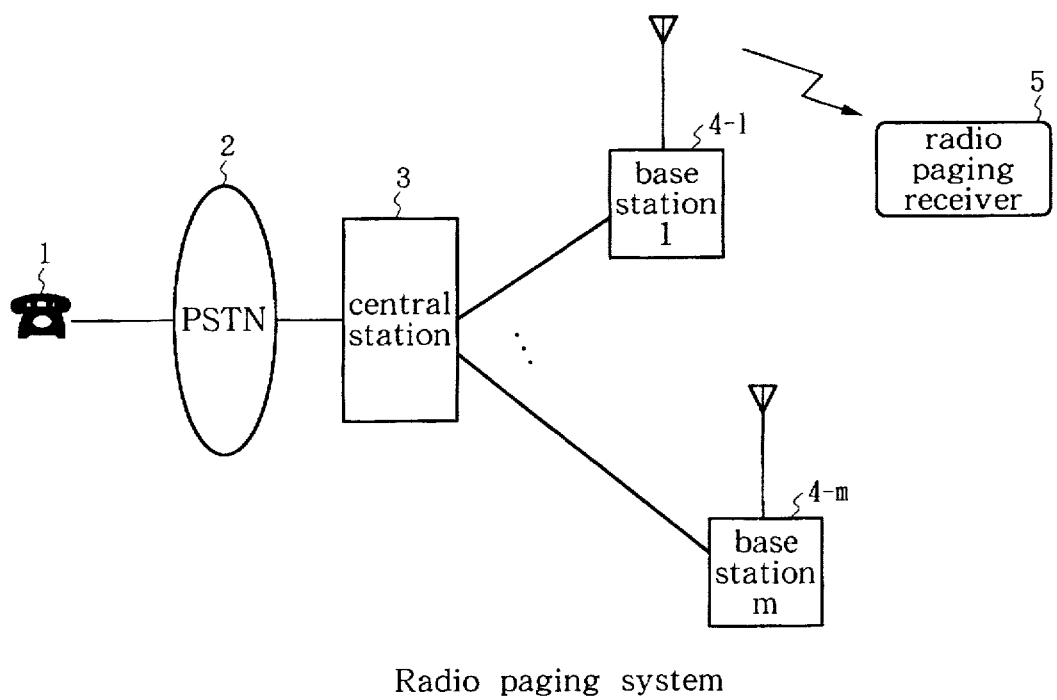
Radio paging system
Fig. 1
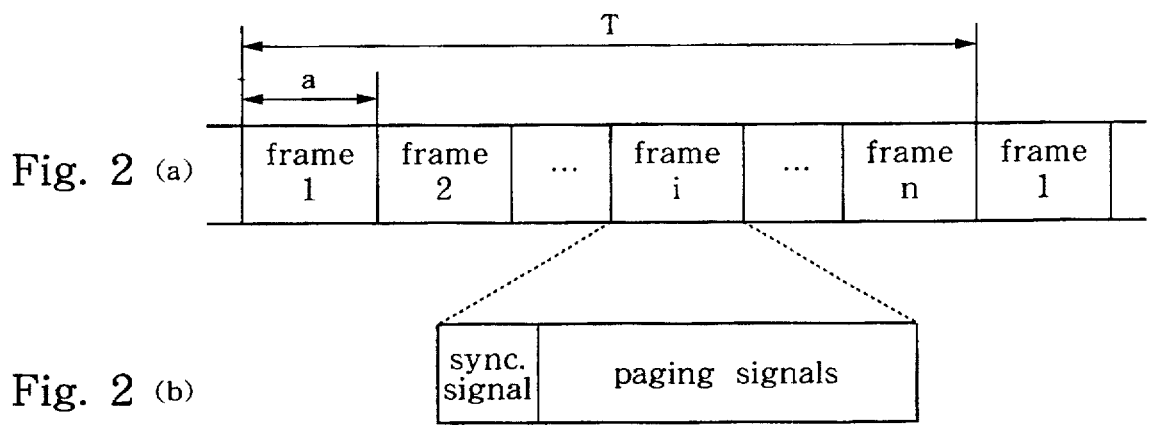
Fig. 2 (a)
Fig. 2 (b)
Radio paging signal sequence

RECEIVER WITH SYMBOL RATE SYNC

This is a Continuation of International Appln. No. PCT/JP95/01152 filed Jun. 9, 1995 which designated the U.S.

TECHNICAL FIELD

This invention is utilised in receivers which receive radio signals. It relates in particular to a receiver for radio communications wherein signals are transmitted at a plurality of different symbol rates. This invention is suited in particular to utilisation as a radio paging receiver.

BACKGROUND TECHNOLOGY

An established practice in the field of radio communications is to change over the symbol rate of the transmitted signal among a plurality of values in accordance with the state of the radio channel and the required transmission quality or capacity. In particular, in radio paging systems which enable small receive-only devices carried by subscribers to be called, the practice is to increase symbol rate in areas where there are many subscribers, and to decrease symbol rate in areas where there are few subscribers. Another practice within a given area is to increase symbol rate during the day and to decrease it at night. Changeover of symbol rate is carried out from the base station, with a control signal being used to notify the receiver.

FIG. 1 shows a typical configuration of a radio paging system, and serves as an example of a radio communications system wherein transmission of signals is accompanied by the symbol rate being changed over among a plurality of different values. In order to call radio paging receiver 5 from telephone terminal 1, the number of this radio paging receiver 5 is input fiom telephone terminal 1, together with any message. This information that has been input is sent as a paging request signal to central station 3 via public switched telephone network (PSTN) 2. In central station 3, this paging request signal is converted to a paging signal sequence for the radio paging system, and is sent out to base stations 4-1, . . . , 4-m. Base stations 4-1, . . . , 4-m each convert the paging signal sequence received from central station 3 to a radio signal (i.e., to radio waves) and transmit this to radio paging receiver 5.

FIGS .2(a) and (b) show an example of the configuration of a paging signal sequence received by radio paging receiver 5. As shown in FIG.2(a), this paging signal sequence comprises frame sequences of period T, each such frame sequence consisting of n frames of signal length a joined together (where n is a natural number). As shown in FIG.2(b), each frame comprises a synchronisation signal and a paging signal. Radio paging receiver 5 is capable of receiving only during one or more predetermined frames within the n frames, when it receives this frame or these frames. This receiving method is called "intermittent receiving" and serves to extend the life of the battery in radio paging receiver 5. When radio paging receiver 5 has detected a signal for itself among the paging signals of the received frames, it outputs an alert or some other alarm, thereby letting the user know that there has been a call.

A control signal for notifying radio paging receiver 5 of the symbol rate of the paging signal that will be transmitted next is inserted in the synchronisation signal at a predetermined position. Radio paging receiver 5 uses this synchronisation signal to establish frame synchronisation; to recognise the symbol rate of the paging signal which will be received next and the time until changeover of the symbol rate; and to alter its internal processing. A notification of both a symbol rate changeover and the time at which it will occur can be acheived by means of the control signal. However, even if only the alteration of symbol rate is conununicated, the time until the changeover can be decided at radio paging receiver 5 provided that the signal format is known in advance.

FIG.3 shows an example of the configuration of a prior art receiver which receives such a signal, i.e., a signal the symbol rate of which is chaned over. The following explanation will not be restricted to radio paging receivers, and will apply to a general receiver.

This receiver has antenna 11, receiving detector 12, clock recovery 14, detector output terminal 15, clock output terminal 16, controller 17, and variable band width low-pass filter 13.

The radio signal received by antenna 11 is input to receiving detector 12 and detected. The detector output signal which is output from receiving detector 12 passes through variable band width low-pass filter 13 which serves to remove unwanted signals, and is then output to detector output terminal 15, and is also input to clock recovery 14 and controller 17. Controller 17 detects any control signal, which communicates the symbol rate, in the detector output signal that has passed through variable band width low-pass filter 13. As well as recognising the present symbol rate, controller 17 recognises the symbol rate after the next changeover and the symbol rate changeover timing, and communicates this information to clock recovery 14 and variable band width low-pass filter 13 via control line 18. Clock recovery 14 alters the frequency division ratio on the basis of the notified symbol rate and its changeover timing; recovers the clock corresponding to the symbol rate from the detector output signal after band width limitation; and outputs the recovered clock to clock output terminal 16. Variable band width low-pass filter 13 alters its band width on the basis of the notified symbol rate and its changeover timing. Band width $f_b$ of variable band width low-pass filter 13 is set so that, for example, $f_b=(1/\text{symbol rate})$.

"Symbol rate" as used here means the Baud rate and expresses how many times modulation occurs in unit time. For example, in binary modulation, when the bit rate is 3200 bps, the symbol rate is 3200 sps; whereas in quadruple modulation, when the bit rate is 3200 bps, the symbol rate is 1600 sps.

By thus altering the pass band width imposed on the detector output signal, the following advantages are obtained over the case in which the pass band width is fixed regardless of the symbol rate. Namely, it becomes possible to prevent degradation of signal transmission performance resulting from: (1) loss of signal components due to the band width at a certain symbol rate being too narrow; (2) incomplete removal of unwanted signals due to said band width being too wide.

The explanation that has just been given with reference to FIG. 3 concerns receivers in general. However, it is also possible to utilise this configuration as the receiving part of a radio paging receiver. In this case, the outputs of detector output terminal 15 and clock output terminal 16 are input to a decoder, whereupon paging signals for the pager in question are detected. When a paging signal for the pager in question has been detected in the decoder, an alert is output, together with another alarm if required, thereby notifying the user that there has been a call.

However, the delay time in a variable band width low-pass filter will generally change in accordance with band width. Namely, the amount of delay when a variable band width low-pass filter has a wide band width will be smaller than when the band width is narrow. Accordingly, if band width $f_b$ is set on the basis of the changeover symbol rate to $f_b = (1/\text{symbol rate})$ for example, discontinuities will occur in the output of variable band width low-pass filter 3. There will therefore be periods during which it is impossible to recover a clock that is synchronised with the symbol rate.

It is an object of this invention to overcome this sort of problem, and to provide a receiver which can recover a clock that is synchronised with the symbol rate after changeover, without discontinuities occurring when the symbol rate is changed over.

DISCLOSURE OF THE INVENTION

A receiver according to this invention has: a receiving detector means which receives a signal which is transmitted while the symbol rate is changed over among a plurality of different values; a filter means with a variable band-pass width which removes unwanted signals from the output of this receiving detector means; and a control means which decides the symbol rate of the signal received by the receiving detector means, and which alters the pass band width of the filter means in accordance with this symbol rate; and this receiver is characterised in that it has a means which compensates for changes in the delay of the filter means, said changes being produced by alterations of the pass band width of the filter means.

The compensating means should comprise a variable delay means provided at the input or the output of the filter means. The variable delay means should comprise a means which is set in correspondence with the symbol rate determined by the control means, in such manner that the total delay remains constant, said total delay being the sum of the delay imposed on the output of the receiving detector means by the filter means, and the delay due to the variable delay means. In other words, this total delay is the delay at the output of the filter means when the variable delay means has been provided at the input of the filter means. Alternatively, the total delay is the delay at the output of the variable delay means when said variable delay means has been provided at the output of the filter means.

A clock recovery means, which recovers the clock corresponding to the symbol rate determined by the control means, should also be provided, said clock being recovered from the output of the filter means, said filter means having any change in its delay compensated for by the compensating means.

By compensating for a change in the delay of the filter means produced by alteration of the pass band width, a clock that is synchronised with the symbol rate can be recovered, without discontinuities occurring around the symbol rate changeover. Changes in delay can be compensated easily by inserting a variable delay means at the input or the output of the filter means. In other words, by using the delay of a variable delay means to compensate for the delay of the filter means, the delay at the detector output can be kept constant.

The information relating to the changeover of the symbol rate should be contained as a control signal in the signal received by the receiving detector means, and the control means should comprise a means which detects this control signal and recognises the present symbol rate, the symbol rate after the next changeover, and the symbol rate changeover timing.

BRIEF EXPLANATION OF THE DRAWINGS

FIG. 1 shows an example of the configuration of a radio paging system.

FIGS. 2(a) and (b) show an example of the configuration of a paging signal sequence received by a radio paging receiver.

OPTIMUM CONFIGURATION FOR EMBODYING THE INVENTION

Figure 3:
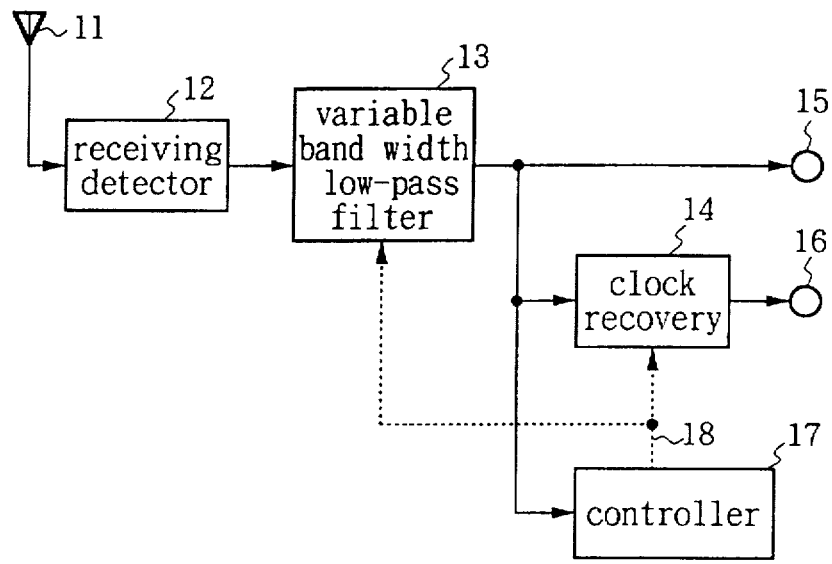
FIG. 3 is a block diagram showing a prior art receiver.
Figure 4:
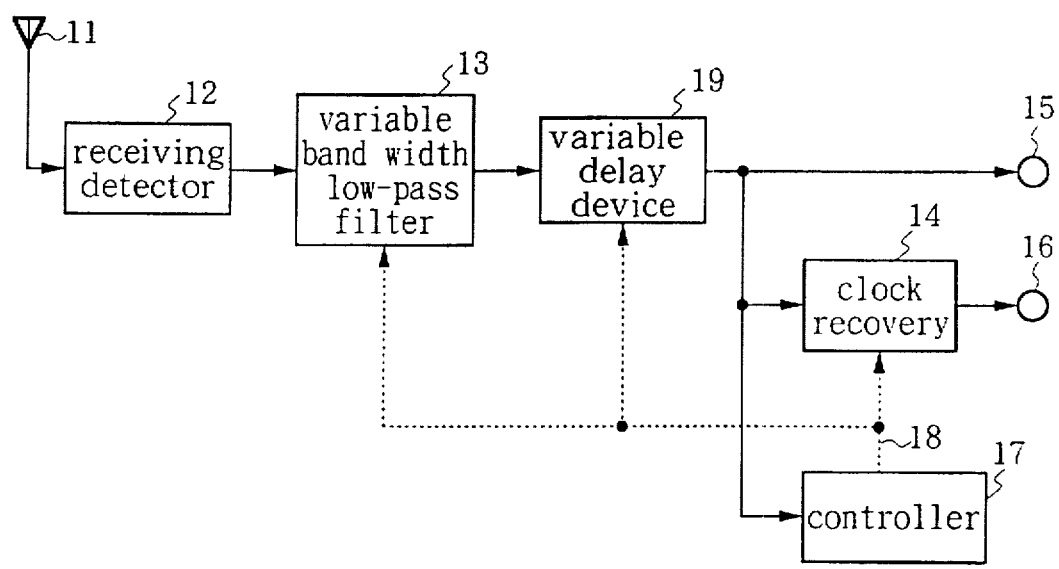
FIG. 4 is a block diagram showing a receiver according to an embodiment of this invention.

FIG.4 is a block diagram showing a receiver according to an embodiment of this invention. Although this invention is suited to utilisation as a receiver for radio paging in particular, the following explanation will deal with a general receiver.

This receiver has antenna 11, receiving detector 12, variable band width low-pass filter 13, clock recovery 14, detector output terminal 15, clock output terminal 16 and controller 17; and variable delay device 19 is provided at the output of variable band width low-pass filter 13.

The radio signal received by antenna 11 is input to receiving detector 12 and detected. The detector output signal which is output from receiving detector 12 has unwanted signals removed by variable band width low-pass filter 13, and is then output to clock recovery 14, detector output terminal 15 and controller 17 by way of variable delay device 19. Controller 17 detects any control signal, which communicates the symbol rate, in the detector output signal that has passed through variable band width low-pass filter 13. As well as recognising the present symbol rate, controller 17 recognises the symbol rate after the next changeover and the symbol rate changeover timing, and communicates this information to variable band width low-pass filter 13, clock recovery 14 and variable delay device 19 via control line 18. Clock recovery 14 alters the frequency division ratio on the basis of the notified symbol rate and its changeover timing; recovers the clock corresponding to the symbol rate from the detector output signal after band width limitation; and outputs the recovered clock to clock output terminal 16. Variable band width low-pass filter 13 alters its band width on the basis of the notified symbol rate and its changeover timing. Variable delay device 19 sets its delay in correspondence with the band width of variable band width low-pass filter 13. That is to say, variable delay device 19 sets its own delay so that the delay from the output of receiving detector 12 to the output of variable delay device 19 is constant regardless of the symbol rate and the band width of variable band width low-pass filter 13. As a result, the input to clock recovery 14 ceases to become discontinuous when the symbol rate is changed over.

In this embodiment, it is assumed that variable delay device 19 is positioned at the output of variable band width low-pass filter 13, and that its delay is controlled adaptively at the filter output. On the other hand, this invention can likewise be implemented with a configuration wherein variable delay device 19 is positioned between receiving detector 12 and variable band width low-pass filter 13, so that the delay of the detector output is controlled and then input to variable band width low-pass filter 13.

The embodiment explained above can be utilised as the receiver part of a radio paging receiver. In this case, the outputs of detector output terminal 15 and clock output terminal 16 are input to a decoder, whereupon paging signals for the pager in question are detected. When a paging signal for the pager has been detected in the decoder, an alert is output, together with another alarm if required, thereby notifying the user that there has been a call.

As has been explained above, when the pass band width of the filter through which the detection output passes alters in accordance with the symbol rate of the received signal, a receiver according to this invention can delay the detector output so as to compensate for a change in the delay of the filter. The effect of this is that a clock that is synchronised with the symbol rate can be recovered even when the symbol rate is changed over.

We claim:

1. A receiver comprising:

receiving detector means for receiving a signal which is transmitted while a symbol rate is changed to a new value from among a plurality of different values;

filter means, with variable band-pass width, for removing unwanted signals from an output of the receiving detector means;

control means for recognizing the symbol rate of the signal received by the receiving detector means, and for altering the variable band-pass width of the filter means in accordance with the symbol rate; and means for compensating for changes in a delay of the filter means, the changes being produced by alterations of the variable band-pass width of the filter means.

2. The receiver as set forth in claim 1, wherein the compensating means comprises variable delay means provided at one of an input and an output of the filter means.

3. The receiver as set forth in claim 2, wherein the variable delay means comprises means for setting a delay of the time variable delay means in accordance with the symbol rate recognized by the control means, in such manner that a total delay remains constant, the total delay being a sum of the delay imposed on the output of the receiving detector means by the filter means, and the delay due to the variable delay means.

4. The receiver as set forth in claim 1, further comprising clock recovery means for recovering a clock corresponding to the symbol rate recognized by the control means, the clock being recovered from an output of the filter means, the filter means having any change in the delay compensated for by the compensating means.

5. The receiver as set forth in claim 1, wherein:

information relating to a change of the symbol rate is included within a control signal in the signal received by the receiving detector means; and the control means comprises means for detecting the control signal and for recognizing a present symbol rate, a symbol rate after a next changeover, and a symbol rate changeover timing.

6. The receiver as set forth in any one of claims 1 to 5 wherein the receiver receives paging signals in a radio paging system.

* * * * *

UNITED STATES PATENT AND TRADEMARK OFFICE
CERTIFICATE OF CORRECTION

PATENT NO. : 5,760,702
DATED : June 2, 1998
INVENTOR(S) : Shogo Ito, Yasushi Yamao, Shinzo Ohkubo It is certified that error appears in the above-identified patent and that said Letters Patent is hereby corrected as shown below:

On the title page : Item "[73]

Please change: Assignee: Nit Mobile Communications Network Inc., Tokyo, Japan"
to
--[73] Assignee: NTT Mobile Communications Network Inc., Tokyo, Japan--.

Please add: --Related U.S. Application Data

[63] Continuation of international application PCT/JP95/01152 filed June 9, 1995--.

Signed and Sealed this

Twenty-second Day of February, 2000

Attest:

Q. TODD DICKINSON

Attesting Officer        Commissioner of Patents and Trademarks